United States Patent

Degginger

[15] 3,690,727

[45] Sept. 12, 1972

[54] DUST SUPPRESSING DURING MINING PROCESS

[72] Inventor: Edward R. Degginger, Convent Station, N.J.

[73] Assignee: Allied Chemical Corporation, New York, N.Y.

[22] Filed: Oct. 13, 1970

[21] Appl. No.: 80,483

[52] U.S. Cl. ..........................299/12, 55/84, 252/88
[51] Int. Cl. ...............................................E21c 41/00
[58] Field of Search ........252/88; 299/12; 117/137 X

[56] References Cited

UNITED STATES PATENTS 2,342,150   2/1944   Kleinicke.................252/88 X
2,436,146   2/1948   Kleinicke...................252/88
2,786,815   3/1957   Buggisch et al..........299/12 X
2,809,949   10/1957  Orth ......................117/137 X

*Primary Examiner*—Ernest R. Purser
*Attorney*—Arthur J. Plantamura and Herbert G. Burkard

[57] ABSTRACT

Dilatant compositions comprising aqueous solutions containing 0.5 to 6.0 weight percent alkali metal borate and 0.5 to 6.0 weight percent water soluble polyvinyl alcohol are effective dust suppressants and collectors.

9 Claims, No Drawings

DUST SUPPRESSING DURING MINING PROCESS

BACKGROUND OF THE INVENTION

This invention relates to dust suppression and collection, and more particularly to the use of an aqueous dilatant solution for purposes of dust collection or dust suppression.

Dust suppression and dust collection are related but distinct processes. Dust collection involves the removal of finely comminuted solid particulate matter from a gas in which said particulate matter is suspended. Dust suppression connotes the prevention or reduction of the extent to which finely particulate solid matter becomes suspended in a gas, usually air. In the latter case, the finely particulate solid matter can be either already in existence or being produced as a result of various mechanical operations such as grinding, milling, cutting, pounding, exploding, and the like. The desirability of procedures for dust collection and dust suppression are well-known inasmuch as dust produced by a variety of industrial processes is one of the major causes of air pollution.

A variety of procedures and apparatus are available for dust collection including inertial and electrostatic precipitators, packed-bed filters, and the like. One of the more popular forms of dust removal apparatus is the so-called gas scrubber. Scrubbers which utilize a liquid, usually water, to assist in removing contaminants from a gas stream are referred to in the art as wet gas scrubbers (hereinafter W. G. scrubbers). W. G. scrubbers are basically of two different types, the low energy type and the venturi type. The low energy types pass the dust containing gas either through the liquid in a restricted passage, through a plate or packing on which a head of liquid is maintained, or through one or more chambers equipped with sprays. The low energy W. G. scrubbers are thus seen to include open spray towers, packed towers, wet centrifugal or cyclone towers, flooded bed scrubbers, orifice scrubbers, and wet dynamic scrubbers. A cyclone scrubber, for example, utilizes a procedure whereby the dust containing gas enters a conical or cylindrical chamber and leaves axially. Because of the change of direction of the gas stream, the dust particles are flung to the inner surface of the wall of the chamber from which they drop to the bottom of the chamber. To increase the particle fallout tendency, the gas passes through sprays of liquid, usually water, in the course of its passage through the chamber.

Venturi scrubbers utilize a venturi for the intermixing of dust laden gas and the scrubbing liquid by impacting the gas at high velocity with liquid injected into the venturi. such scrubber include the so-called dry and wet venturi, the flooded disc, and the ejector venturi type W. G. scrubbers. The common denominator of all these W. G. scrubbers of both low and high energy types is their purpose which is, of course, to remove suspended solid particulate matter from a gas stream and their use of a liquid, usually water, to effect this primarily by adhesion of dust particles to the liquid droplets with which they come into contact.

A detailed description of most of the various W. G. scrubbers currently in use is found in Chem. Eng. 75 10/14 at 152 et seq., (1968). However, an understanding of the mechanical operation of these various types of separators is not critical to this invention. The critical factor is their utilization of a liquid to adhere to dust particles to facilitate the removal thereof from a gas stream. Because of its many desirable properties, water is almost universally used as the W. G. scrubber liquid. Any modification of the water which would improve its tendency to adhere to dust particles would, of course, thereby tend to improve the effectiveness of the scrubbing operation.

Dust suppression is another field which makes wide use of liquids, again usually water, to adhere to finely particulate solid matter. It is frequently necessary to "wet-down" piles of finely particulate matter to prevent such matter from blowing away or otherwise becoming suspended in the atmosphere. For example, a large variety of industrial processes produce side products in the form of a fine powder. This side product is usually stored in large heaps which must be periodically wetted-down, i.e., sprayed with water, to avoid quantities of such powder becoming suspended in the atmosphere and thereby posing a pollution problem. One of the problems with the use of water is that it frequently runs off, evaporates, and/or trickles into the interior of the pile of particulate matter. Any modification of water which would reduce its evaporation and run-off tendency would therefore improve its usefulness in such application.

Finally, as heretofore indicated, many mechanical operations such as drilling, cutting, routing, grinding, milling, exploding, and the like produce large quantities of dust which become suspended in the air and thus pose a problem for those working in the area. These various related operations may be generically categorized by the term "machining." A particularly well-known operation posing this type of problem is mining, especially coal mining. When an underground vein of coal is broken into fragments of a size convenient for removal by modern mining machinery or by explosive charges, large quantities of coal dust are also produced which become suspended in the mine atmosphere. This suspended coal dust is the cause of "black lung" among miners. To reduce the formation of suspended dust, water is sprayed at the solid coal at the point where the mining machine is in operation so as to wash down the dust particles as they are formed and prevent their becoming suspended in the air. Spraying the wall of coal mines immediately prior to coal dislodging explosions will likewise assist in the prevention of dust formation. This spraying is suitably done not only at the mine walls at and in close proximity to the point of explosion or machining, but also on the walls of the tunnel or tunnels leading away from the point of explosion or machining. The purpose of this, of course, is to pick up coal dust particles which impinge against the tunnel walls as they are blown through them by the force of the explosion. Additionally, it is desirable to wet-down the walls of all mine shafts or tunnels actually in use. These tunnel and shaft walls are usually coated with dust and the vibration caused by the passage of machinery therethrough causes this dust to shake loose and become suspended in the surrounding air. Again, any modification of water which would increase its tendency to adhere to the solid coal and also to the coal dust particles and also reduce its evaporation tendency would reduce the number of such particles which become and remain suspended in the air.

SUMMARY OF THE INVENTION

It is an object of this invention to provide an improved process for dust collection and dust suppression. Specifically, it is an object of this invention to provide an improved process for dust collection and dust suppression when such collection or suppression is at least in part achieved by contacting the dust with water.

Further objects and advantages will become apparent from the description of the invention which follows in greater detail.

As heretofore indicated, if water could be modified so as to enhance its affinity for particulate matter, i.e., the tendency of the dust particles to adhere to the water with which they come in contact, the efficiency of the known prior art dust suppression and dust collection processes would be significantly enhanced. Likewise, it is desirable to reduce the evaporation tendency of water and in many instances its fluidity, i.e., its tendency to run off vertical or inclined surfaces. It has now been found in accordance with the instant invention that aqueous dilatant solutions containing from about 0.5 to 6.0 weight percent water soluble vinyl alcohol polymer and from about 0.5 to 6.0 weight percent alkali metal borate are superior to water alone in dust suppression and dust collection applications. This superiority is due not only to the greater adhesion tendency of the aqueous dilatant solution, but alsO because of its lesser tendency to evaporate and/or run off in comparison with water.

As heretofore indicated, a wide variety of apparatus which utilize water are available to remove dust particles from gas streams. The aqueous dilatant solutions of the instant invention can be advantageously substituted for water in such apparatus, especially W. G. scrubbers, the only modifications to the apparatus being those occasioned by the necessity of pumping a somewhat more viscous fluid than water. Where the dust collecting apparatus utilizes a spray of water, the dilatant solution can be formed externally and charged to the apparatus or alternatively, generated in situ as hereinafter explained.

I have found that if separate aqueous solutions of alkali metal borate and PVA, respectively, are brought together in the form of converging streams of the respective solutions, a dilatant solution is essentially instantaneously formed. Under such circumstances, the spray of dilatant solution with which the gas borne dust particles come in contact is substantially identical to the spray formed when a previously formed dilatant solution is sprayed onto the gas borne dust particles. However, the mechanical problems entailed in handling a dilatant solution are avoided since such solution is formed exterior to all mechanical dispensing equipment and only immediately prior to the dilatant solutions first contact with the dust particles. In dust collection apparatus which does not utilize a liquid spray but rather a pool or other essentially static mass of liquid through or over which the gas containing the dust particle must pass, such as an orifice scrubber, then it is comparatively unimportant whether the dilatant solution is formed externally or in situ in the dust collection apparatus.

The terms "spray" and "stream" are used interchangeably herein. In some references, a distinction is made between the two terms depending upon whether the liquid in question is emitted in the form of a continuous flow of liquid or in the form of more or less separate liquid particles interspersed with air, i.e., a mist. Such a distinction is not technically significant for purposes of the present invention and therefore the terms "stream" or "spray" shall encompass both a continuous flow of liquid and one wherein the liquid is interspersed with air.

The size of the dust particles that can be removed utilizing the dilatant solutions of my invention can be as small as $0.5\mu$ diameter depending on the design of the scrubbing apparatus. There is no maximum particle size, although in practice, particles larger than about 1 mm diameter are generally more suitably removed from gas streams by other than wet scrubbing apparatus.

When utilizing the dilatant solutions of the instant invention as dust suppressants, such solution is ordinarily sprayed over the surface of a material (hereinafter substrate) which is already in finely particulate form or which is about to be subjected to any mechanical operation, e.g., shearing, cutting, milling, pounding, grinding, exploding, and the like causing the formation of fine particles.

The substrates already in finely particulate form which can advantageously be "wetted-down" with the dilatant solutions of the instant invention are virtually limitless, the only limitation being, of course, that the material be substantially water insoluble. Finely particulate, both vegetable and inorganic material such as ore, grain, textile lint, and the like can therefore advantageously be treated.

When sprayed on the dust coated, e.g., coal dust, walls of mine shafts and tunnels, the dilatant solutions of my invention are particularly desirable. Water alone will run off and even the water which actually remains on the walls will evaporate. My dilatant solutions not only adhere readily to the walls, but after evaporation of the aqueous component thereof, afford a substantially impermeable coating or skin comprising the nonaqueous components of the dilatant solution.

When a frangible substrate is treated prior to a mechanical operation, again, the only limitation is that the substrate be substantially insoluble in the dilatant solution. Such treatment is particularly advantageous in the case of coal mines where the mine walls both at the point of machining or explosion and contiguous, i.e., in close proximity, thereto are sprayed with the aqueous dilatant solution of the instant invention. The term "contiguous" connotes wall surfaces within a distance of up to 100 feet from the point of operation. Although, as previously indicated, all mine walls in shafts or tunnels actually in operation can advantageously be sprayed with dilatant solution. The aqueous dilatant solution forms on the mine walls a tacky coating which does not run off like water and which adheres readily to the walls and affixes any dust particle impinging thereon. Because of its tackiness, the dilatant solution substantially reduces dust formation at the actual point of explosion or machining. Where water cooled machines are utilized, the cooling can be with aqueous dilatant solution instead; thereby readily providing said dilatant solution at the actual point of operation where the dust is being generated. The solution is preferably sprayed in two separate combining mists with air pressure at the site of machining to capture the coal dust as it is produced. Other operations wherein the frangible substrate can advantageously be coated with dilatant solution in accordance with the instant invention include bauxite, rutile, cinnebar mining and stone quarrying and sawing.

The rate of application of the dilatant solution will obviously vary with the substrate being treated. Ordinarily from about 0.5 to 10 gallons per 100 square feet of substrate surface is a suitable application rate. However, it should be borne in mind that the upper limit of application is in general determined only by economic practicability. The lower limit is determined by the dust forming tendency of the substrate and by the degree of dust suppression desired or required. In general, the more solution applied, the greater the degree of dust suppression.

The dilatant solution can, of course, be prepared by separately adding borate and PVA to an agitated an preferably heater aqueous menstruum, or by combining separate aqueous PVA and aqueous borate solutions. Alternatively, the dilatant solution can be generated from converging streams of borate and PVA solution immediately prior to deposition of the combined stream on the substrate. That is, in the practice of my invention, the separate aqueous solutions of alkali metal borate and PVA would be separately stored, ordinarily in tanks or similar containers, although for certain large scale operations, other type containers such as ponds can also be utilized.

When it is desired to utilize the dilatant composition for treating any frangible substrates to reduce its dust forming tendencies, converging streams of the two solutions are sprayed at the substrate. The two streams on converging essentially instantly form the viscous dilatant solution having the aforementioned dust suppressant properties. The convergence of the two streams can be effected at any point from the point at which the two streams exit from the dispensing apparatus up to the point at which the streams impinge on the substrate since, as above indicated, the dilatant solution forms almost instantaneously. Preferably, the streams will be converged to form the dilatant solution as soon as possible after leaving the dispensing apparatus. This is most readily achieved by utilizing two immediately adjacent nozzles which are so shaped and positioned that the streams issuing from the respective nozzles converge essentially instantly after such emergence. Alternatively, the two nozzles can be arranged in concentric fashion with an outer nozzle essentially coaxially concentrically disposed around an inner nozzle with the exit apertures of both nozzles likewise being essentially concentric and coterminous. The exact fashion in which convergence of the streams is achieved is not critical since it is only necessary that convergence take place at some point between or even on the substrate, as heretofore indicated. The advantage of utilizing a dilatant solution which is formed only immediately prior to its application to the substrate being treated is that the dilatant solution is not handled by mechanical equipment, that is, the convergence of the two streams is exterior to the dispensing mechanism.

This design of converging or concentric nozzles is also suitably utilized in the hereinbefore described modified W. G. scrubbers to achieve in situ generation of the dilatant solution spray.

The pumping or other solution transfer equipment utilized to spray the converging streams is a matter of choice and any of the conventional equipment which is currently available for spraying essentially noncorrosive, aqueous solutions of wide viscosity range can be utilized.

These separate streams can as heretofore indicated take the form of mists propelled by air pressure to yield a foam, particularly suited to trapping dust formed by a tool which is machining a frangible substrate.

The dilatant solutions of the instant invention contain from about 0.5 to 6.0 weight percent PVA and from about 0.5 to 6.0 weight percent alkali metal borate. Where the dilatant solution is being formed prior to use, the appropriate quantities of borate and PVA are merely added either simultaneously or consecutively to water, preferably with heating and agitation. In the case where such dilatant solution is obtained by the combination of two separate solutions or flowing streams, possibly at differing flow rates, the operable concentration of PVA and borate in the respective separate solutions prior to combination cannot be given with exactitude. Assuming equal volumes of the two solutions are being combined, the concentrations of the PVA and borate in the respective separate solutions could vary from 1.0 to 12.0 weight percent, which on combination would provide the final desired concentration of 0.5 to 6.0 weight percent of each. It is of course not necessary that the concentration of PVA and borate in the combined stream be identical since dilatant solutions are obtained as long as both components are each present in the combined stream in a concentration ranging from 0.5 to 6.0 weight percent. The preferred concentration of alkali metal borate and vinyl alcohol polymer in the dilatant solutions of this invention will range from about 2.0 to 6.0 percent by weight of each.

To increase the solubility of the borate in cold water, I have found it advantageous to add to the water prior to or simultaneously with the borate from 0.5 to 10 weight percent, based on the weight of the water present in the dilatant solution as ultimately constituted, of a $C_2$ to $C_{12}$ water soluble polyhydric alcohol.

In the case where the borate and PVA are dissolved in separate solutions which are thereafter combined, the concentration of polyhydric alcohol, even as borate, will of course, be greater in the borate containing solution prior to combination with the PVA containing solution to form the dilatant solution. The concentration of polyhydroxy alcohol in the borate solution should be such as to afford a concentration of polyol in the dilatant solution ranging from 0.5 to 10.0 weight percent, preferably 3.0 to 7.0 weight percent.

The term "water-soluble polyhydric alcohol" as used in the instant application connotes a $C_2$ to $C_{12}$ polyhydroxy nonaromatic hydrocarbon, i.e., alkane, alkene, cycloalkane, orcycloalkene, having from 2 to 8 hydroxyl groups. The term "water-soluble," as applied to such polyols, connotes that the polyol is soluble in water to the extent of at least 25 weight percent at 25° C.

Examples of suitable water-soluble $C_2$ to $C_{12}$ polyhydroxy nonaromatic hydrocarbons include, for example, ethylene glycol, diethylene glycol, triethylene glycol, trimethylene glycol, mono- and dipropylene glycol, glycerol, erythritol, pentaerythritol, trimethylol ethane and trimethylol propane, arabitol, adonitol, xylitol, mannitol, sorbitol, iditol, dulcitol, mono- and disaccarides such as glucose, dextrose, fructose, sucrose, Enzose*

(* Enzose is a trademark of the Corn Products Co.), and the like, and the various isomeric cyclohexane triols and n-hexane triols. Most preferred are glucose, Enzose, and sucrose.

The term "alkali metal borate," as used in the instant specification and in the appended claims, embraces not only the alkali metal salts of the common boric acids, i.e., tetraboric acid, $H_2B_4O_7$, meta-boric acid, $HBO_2$, and orthoboric acid, $H_3BO_3$, but also the other boric acids such as $H_2B_2O_4$, $H_2B_6O_{10}$, $H_2B_{12}O_{19}$, $H_6B_4O_9$, and $H_6B_8O_{15}$. With the exception of the meta- and orthoborate salts, such alkali metal borates have the general formula $M_2O \cdot mB_2O_3$, wherein M denotes an alkali metal and $m$ can range from 1 to 4. Hydrates of the above enumerated borate salts are also suitable.

Either a single borate salt or any mixture thereof can be used. Ordinarily, no advantage accrues from the use of a mixture of borates. Likewise, although alkali metals other than sodium and potassium are perfectly usable, they are not preferred for economic reasons.

The preferred borate is borax, i.e., sodium tetraborate decahydrate.

The term "water-soluble vinyl alcohol polymer" as used herein and in the appended claims embraces vinyl alcohol polymers having up to 50 percent of the hydroxyl groups thereof replaced by methoxy, ethoxy, acetyl, propionyl, or butyryl radicals, i.e., partially etherified or esterified polyvinyl alcohol. Said methoxy and ethoxy ether radicals can be unsubstitued or substituted with hydroxyl or carboxyl groups. Said acetyl, propionyl and butyryl radicals can likewise be unsubstituted or can be halogen- or hydroxyl-substituted. Preferably, no more than about 20 percent of the polyvinyl alcohol hydroxyl groups will be replaced by any of the aforementioned ether or ester radicals. The term "water-soluble" means that the polymer is soluble to the extent of at least 5.0 weight percent in water at room temperature, although heating the water to a higher temperature of up to 95° C. may be necessary in some instances to initially dissolve the polymer.

The vinyl alcohol polymers utilized in the practice of the instant invention can, therefore, be represented by the structural formula

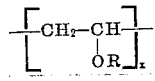

wherein $x$ can range from about 1,200 to about 5,000, preferably 1,600 to 3,000, and wherein R represents hydrogen-, methyl-, ethyl-, acetyl-, propionyl-, butyryl-, hydroxyl-, or carboxyl-substituted methyl or ethyl, or halogen- or hydroxyl-substituted acetyl, propionyl or butyryl, and wherein at least 50 percent of said R groups are hydrogen. The water-soluble vinyl alcohol polymers of the instant invention can have molecular weights ranging from about 50,000 to about 450,000, and preferably from about 70,000 to 200,000. As above indicated, preferably at least 80 percent of said R groups will be hydrogen.

Vinyl alcohol polymers are conventionally obtained by polymerizing esters of vinyl alcohol followed, where appropriate, by saponification of the ester groups. To prepare the polymers of the instant invention, wherein up to about 50 percent of the R groups are acyl, one polymerizes the corresponding vinyl ester to afford the polyvinyl ester having all R groups acyl and then partially or fully saponify said polyvinyl ester and thereby remove 50 percent or more of the acyl groups. For example, to prepare polyvinyl alcohol containing 20 percent acetyl groups, polyvinyl acetate would be 80 percent saponified and the remaining 20 percent acetyl groups be left unsaponified. To prepare the methoxy and ethoxy ether derivatives of polyvinyl alcohol, a fully saponified material, i.e., polyvinyl alcohol having 98+ percent hydroxy groups, as would be obtained by essentially total saponification of a polyvinyl ester, is etherified up to the desired degree, that is, up to a maximum of about 50 percent of the hydroxyl groups can be etherified using conventional etherification agents such as diazomethane, dimethyl sulfate or diethyl sulfate.

EXAMPLE 1

This experiment was designed to test the comparative effectiveness of a flooded bed W. G. scrubber using water and dilatant solution respectively as the dust contacting liquids. The dust laden atmosphere was provided by the exhaust system of a furniture finishing plant containing 800 ppm of dust. The dust particles comprised mainly of wood dust and small amounts of varnish, paper, and abrasive grit. A standard flooded bed W. G. scrubber having a rated capacity of 500 cubic feet of air per minute was utilized. The maximum particle size involved was about 0.1 millimeter. Using water as a contacting liquid, the scrubber effluent air had a dust content of approximately 150 ppm. When the water was replaced by dilatant solution containing 1 ½ percent 98+ percent hydrolyzed polyvinyl alcohol of 125,000 molecular weight, 2 percent borax, and 2 percent sucrose — all other processing conditions being substantially identical, the effluent gas had a dust content of only 22 ppm.

EXAMPLE 2

An ore benefaction process produced as a byproduct a copious quantity of finely particulate magnesium silicate, which was stored in piles or mounds. Breezes or the passage of trucks caused quantities of this particulate magnesium silicate to become suspended in the adjacent atmosphere with concomitant discomfort to personnel working in the area. Attempts to retard this tendency on the part of the magnesium silicate to billow into the atmosphere by spraying a pile thereof with water was minimally successful since the water would run down off or into the pile or evaporate rapidly. However, dilatant solution containing 2 percent potassium metaborate and 3 ½ percent 80 percent hydrolyzed polyvinyl acetate (80 percent hydroxyl groups/20 percent acetyl groups) of approximately 95,000 molecular weight were sprayed onto the pile. The dilatant solution formed a viscous, tacky coating which did not run into the pile of magnesium silicate, which evaporated more slowly than plain water, and even after it evaporated, the components of the aqueous solution formed a thin translucent skin over the magnesium silicate which prevented clouds of the latter from billowing into the atmosphere and contaminating same.

EXAMPLE 3

A block of coal was machined with a circular, abrasive disc at 3,000 rpms. The machining produced copious quantities of coal dust at the disc cutting surface. Use of a water spray at the disc cutting surface reduced the dust formation but did not entirely obviate it. When the water spray was replaced by a dilatant solution produced by spraying at the coal cutting surface two comingling sprays, one containing 3 ½ percent borax in water and the other 3 ½ percent 98+ percent hydrolyzed polyvinyl alcohol of 125,000 molecular weight in water, a foamy gel resulted which completely prevented the formation of air borne dust. The dust particles produced by the cutting adhered to the dilatant solution which coated the surface of the block of coal and the saw bench immediately adjacent to the cutting surface.

EXAMPLE 4

The relative humidity in coal mines generally averages over 90 percent, therefore, a comparison of the effectiveness of water and dilatant solution at wetting down mine wall surfaces should be carried out under conditions of high relative humidity. Two blocks of coal, each having dusty surfaces, were emersed respectively in water and in a dilatant solution containing 1 ½ percent 80 percent hydrolyzed polyvinyl acetate (80 percent hydroxyl groups/20 percent acetyl groups) of approximately 95,000 molecular weight and 1.75 percent borax and then placed in a closed desiccator containing a pan of water. After 4 days, the block of coal that had been dipped in water had a moist or clammy feel. However, rubbing it with a white cloth removed copious quantities of dust. The block of coal which had been dipped in dilatant solution had a coating of viscous, gel-like material which was only difficultly removable by rubbing it with a cloth and when removed by hard rubbing, the dilatant solution carried all the coal dust with it so that rubbing a portion of the block surface wherein the dilatant solution had been removed produced substantially no coal dust on the cloth.

A third block of coal was dipped in the same dilatant solution and allowed to stand in the atmosphere. After 24 hours, the aqueous components of the dilatant solution had substantially completely evaporated. However, the block of coal was still substantially completely covered with a thin film of PVA/borax which, although dry, had not peeled. Gentle rubbing of the block surface caused no coal dust to become detached. When the block surface was rubbed vigorously, the coating peeled off, taking substantial quantities of coal dust with it. Rubbing the surface of the block from which the coating had been removed caused some coal dust to appear on the cloth, but substantially less than when water alone was used as the spray liquid even when the water sprayed block had been kept at approximately 100 percent relative humidity. If water alone is sprayed on the block of coal and the block allowed to stand outside of the desiccator, in substantially less than 1 hour, the block surface would dry completely and the dusty surface be substantially identical to that of the non-treated block.

EXAMPLE 5

A wooden model, designed to simulate a mine shaft was constructed form plywood. The model consisted of a Z-shaped tunnel 2 ½ inches wide and 2 ½ inches high, the three segments of the "Z" each being 12 ½ inches long. At the very end of the "Z" was placed approximately 10 cubic inches of coal dust held in place by a piece of screening. A 2 × 3/16 inch firecracker was emersed in this pile of dust and the fuse thereof ignited through a small hole in the wall of the simulated mine shaft. The firecracker was thereby set off. The force of the explosion sprayed the coal dust through the segment of the "Z" in which the firecracker and coal dust were placed and through the middle segment of the "Z," with a few small particles of dust appearing on the wall of the third segment, most distant from the coal dust. The simulated mine shaft was then disassembled and scrubbed clean. An identical quantity of coal dust and firecracker and retaining screen were then replaced in the same location. However, the tunnel walls leading from the coal dust were coated with a dilatant solution containing 1 ½ percent polyvinyl alcohol, 2 percent borax and 2 percent glycerine. On this occasion, the explosion of the firecracker produced coal dust deposits in the first segment and approximately one-third of the way through the second segment. There was absolutely no coal dust whatsoever in the third segment of the "Z." This experiment clearly indicates that coating the walls of coal mines with the dilatant solution of the instant invention, prior to mining, will significantly reduce the amount of coal dust which becomes suspended in the mine atmosphere and travels through the mine shafts causing, of course, serious discomfort and injury to workers who must thereafter enter the mine shaft.

I claim:

1. A process for suppressing dust formation comprising applying to the surface of a water insoluble, frangible substrate prior to subjecting said substrate to a dust forming mechanical operation an aqueous dilatant solution containing from about 0.5 to 6.0 weight percent alkali metal borate and from about 0.5 to 6.0 weight percent water soluble polyvinyl alcohol whereby said dilatant solution forms a tacky coating adherent towards dust particles impinging thereon.

2. A process in accordance with claim 1 wherein said substrate is coal.

3. A process in accordance with claim 1 wherein said mechanical operation is machining.

4. A process in accordance with claim 1 wherein said dilatant solution contains as an additional component 0.5 to 10 weight percent of a $C_2$ to $C_{12}$ polyhydric alcohol.

5. A process in accordance with claim 1 wherein said dilatant solution is formed by emitting from a dispensing mechanism converging streams of aqueous polyvinyl alcohol solution and aqueous alkali metal borate solution, said convergence being achieved exterior to said dispensing mechanism for said streams.

6. A process for suppressing dust formation in a coal mine shaft prior to effecting an explosion in said shaft comprising applying to the shaft walls at and contiguous to the point of said explosion an aqueous dilatant solution containing from about 0.5 to 6.0 weight percent alkali metal borate and from about 0.5 to 6.0 weight percent water soluble polyvinyl alcohol whereby said dilatant solution forms a tacky coating adherent towards coal dust particles impinging thereon.

7. A process in accordance with claim 6 wherein said dilatant solution contains as an additional component 0.5 to 10 weight percent of a $C_2$ to $C_{12}$ polyhydric alcohol.

8. A process in accordance with claim 6 wherein said dilatant solution is formed by emitting from a dispensing mechanism converging streams of aqueous polyvinyl alcohol solution and aqueous alkali metal borate solution, said convergence being achieved exterior to said dispensing mechanism for said streams.

9. A process for reducing the tendency of water insoluble finely particulate matter to become suspended in the atmosphere comprising applying to the surface of said particulate matter an aqueous dilatent solution containing from about 0.5 to about 6.0 weight percent alkali metal borate and from about 0.5 to 6.0 weight percent water soluble polyvinyl alcohol whereby said dilatent solution forms a tacky coating adherent towards said particulate matter.

* * * * *